A. M. GYDESEN.
LATHE CHUCK.
APPLICATION FILED MAR. 14, 1918.
1,312,628.
Patented Aug. 12, 1919.
2 SHEETS—SHEET 1.
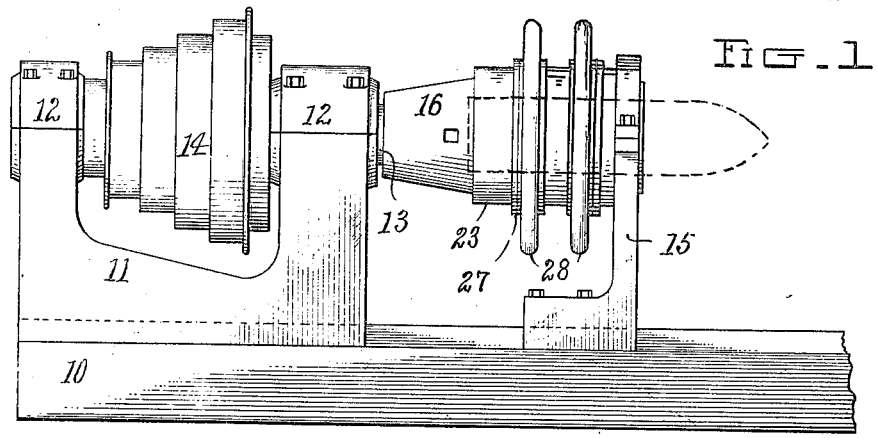
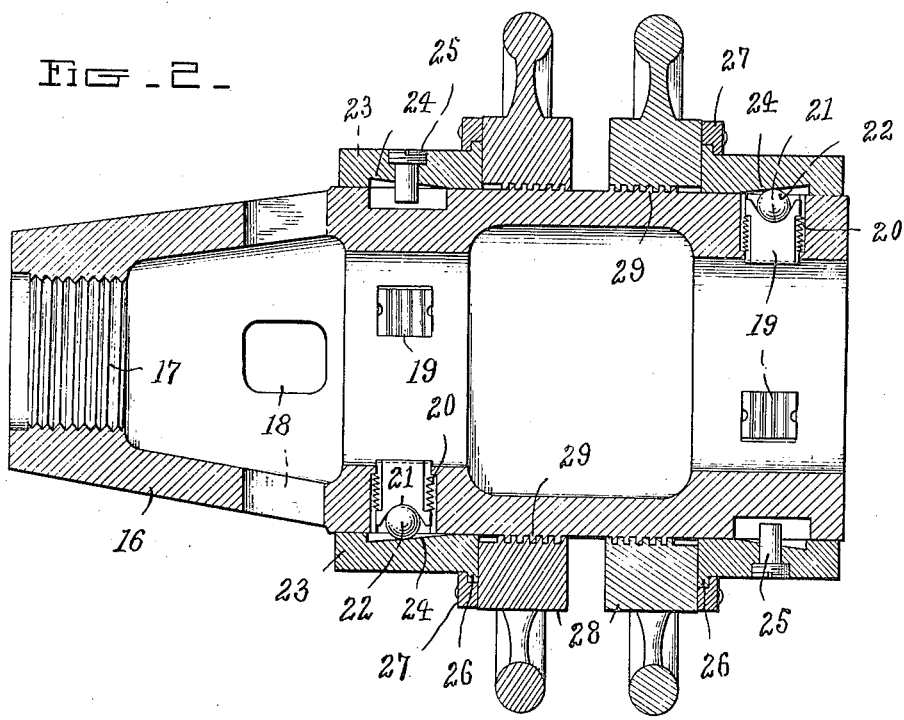
Witnesses
Lillian M. Alling
Inventor
Alfred M. Gydesen
By
Chamberlain & Newman
Attorneys A. M. GYDESEN.
LATHE CHUCK.
APPLICATION FILED MAR. 14, 1918.
1,312,628.
Patented Aug. 12, 1919.
2 SHEETS—SHEET 2.
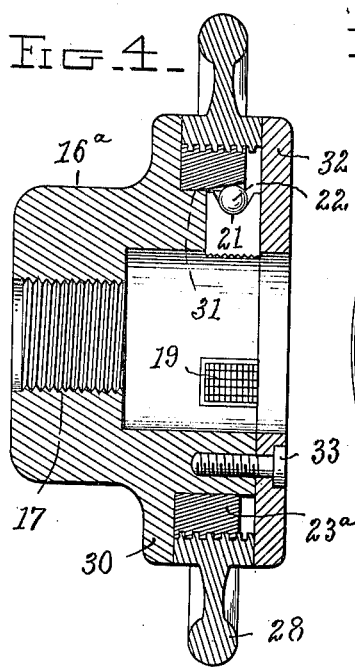
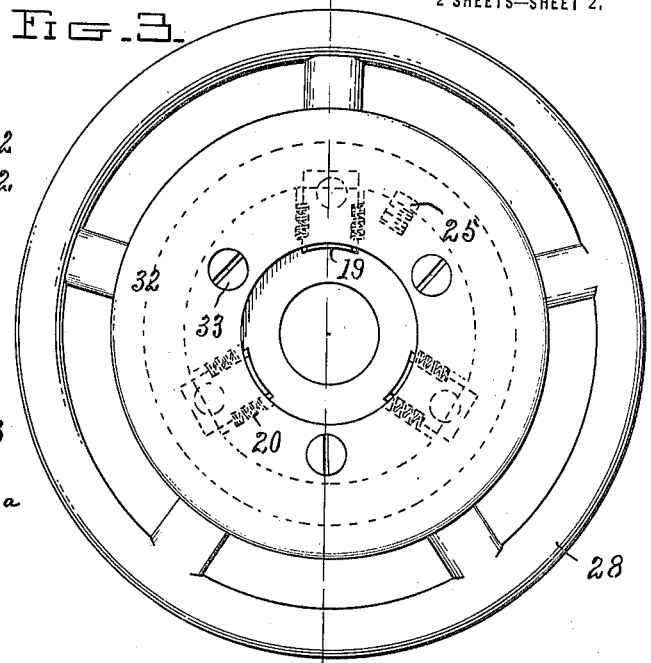
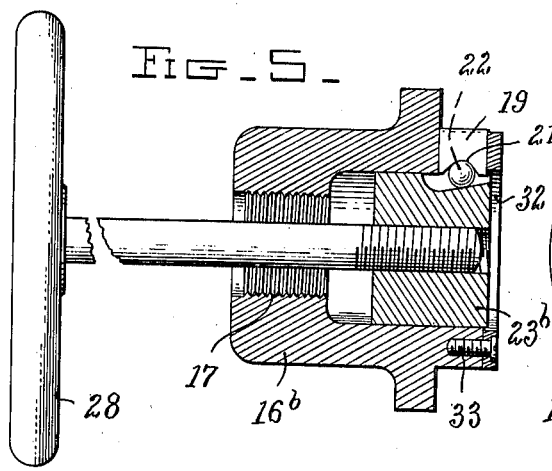
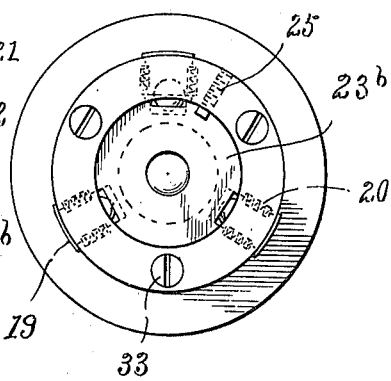
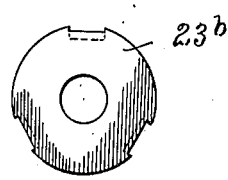
Witnesses
Lillian M. Alling
Inventor
Alfred M. Gydesen
By Chamberlain & Newman
Attorneys

UNITED STATES PATENT OFFICE.

ALFRED M. GYDESEN, OF BRIDGEPORT, CONNECTICUT.

LATHE-CHUCK.

1,312,628.   Specification of Letters Patent.   Patented Aug. 12, 1919.

Application filed March 14, 1918. Serial No. 222,315.

*To all whom it may concern:*

Be it known that I, ALFRED M. GYDESEN, a citizen of the United States, and resident of Bridgeport, in the county of Fairfield and State of Connecticut, have invented certain new and useful Improvements in Lathe-Chucks, of which the following is a specification.

My invention relates to new and useful improvements in lathe-chucks such as are adapted to be secured to the spindle of various forms of horizontal lathes for supporting cylindrical or other forms of work to be turned.

The purpose of the invention is to provide an improved form of lathe chuck that can be removably secured to a lathe spindle in a way to firmly and accurately secure cylindrical or other forms of bodies therein to be operated upon, and especially in a manner to insure accurate work and whereby all pieces of work, of a given kind and size, will be similarly held and turned in a way to produce uniform duplications. The chuck as designed is especially adapted for accurately holding gun shells while being turned, so their point end may be properly turned and finished.

Upon the accompanying drawings forming a part of this specification,

Figure 1 shows a side elevation of a simple form of lathe and support, with my improved form of lathe chuck mounted thereon.

Fig. 2 shows an enlarged central vertical longitudinal sectional view through the double form of lathe chuck illustrated in Fig. 1.

Fig. 3 is a front elevation of a single form of lathe chuck construction along the same general lines as that shown in Figs. 1 and 2.

Fig. 4 shows a central vertical sectional view through the form of chuck shown in Fig. 3 and represented as taken on line 4—4 of said figure.

Fig. 5 shows a central vertical longitudinal sectional view of a modified form of construction of chuck.

Fig. 6 is a front elevation of the construction shown and as seen from the right of Fig. 5, and Fig. 7 shows a front view of the movable member contained within the body of the chuck as shown in Figs. 5 and 6.

As will be noted from the design of my chuck it may be built in duplicate so as to provide two supporting engagements for the work contained therein instead of one. This is desirable in supporting heavy bodies and where no other support for the work is provided other than that of the chuck. The construction, however, of the two mechanisms are similar and their two sets of clamping jaws are operated through separate though similar devices.

The following detail description applies to both of the sets of clamping mechanisms shown in Figs. 1 and 2 as will be seen from the illustrations and reference letters marked thereon.

Referring to the reference characters marked upon the drawings, 10 indicates a lathe bed, 11 a bracket mounted thereon that is provided with bearings 12 to support the lathe spindle 13 and upon which the cone pulley 14 is secured. A standard 15 is also mounted upon the bed and its upper portion forms a bearing in which the forward end of the chuck is rotatably mounted.

Referring further to Figs. 1 and 2, it will be seen that 16 indicates the body portion of the chuck which is of a general cylindrical formation having a threaded inner wall 17 in one end portion for its attachment to a lathe spindle, and further contains holes 18 through which a bar, not shown, may be placed for the screwing on and off of the chuck body. In practice the large end of a gun shell is placed in the hollow of the body as shown in dotted lines Fig. 1, for turning off the tip end of the shell and is engaged and clamped by the two sets of jaws 19, which are arranged at suitable distances apart. There may be any preferred number of these jaws but in practice I find that sets of three, forming three point engagements are preferable. These jaws are arranged in radially formed holes or pockets and are thus adapted to be moved in and out to clamp or release the shell as occasion requires. Shouldered recesses are provided between the jaws and body to receive the springs 20 that are seated therebetween and against the shoulders to normally hold the jaws outward, leaving the interior of the chuck body free to receive the work. The inner end portion of these jaws are preferably knurled to form a better grip upon the work, and in the other end is formed a socket 21 to receive the ball bearings 22 through which the jaws are operated. The movable member 23 which is in the form of a ring, encircles the body portion of the chuck and inclosed the balls and upper end of the jaws. This movable member is further provided with an inclined groove 24, one for each ball, that are arranged to aline with the said balls when mounted in the sockets of the jaws so that a longitudinal sliding movement of the said movable member, will move the jaws inward or permit them to move outward by the action of their springs 20 according to the direction in which the movable member is operated. A guide pin 25 is seated in this movable member and its inner end portion extends into a longitudinal slot in the body of the chuck, to guide the movable member in its forward and backward movement and to prevent rotation thereof. An annular flange 26 is formed upon one edge portion of this movable member and is inclosed by a shouldered ring 27 that is secured to the rotatable operating member 28 and which is provided with an internal thread to engage a similar thread 29 upon the surface of the chuck body.

In the single form of chuck shown in Figs. 3 and 4 the body portion 16$^a$ is provided with an external annular flange 30 and a shouldered cylindrical bearing portion 31 upon which the movable member 23$^a$ is mounted. This movable member encircles the bearing of the body and is adapted to be moved forward and backward to operate the jaws in the same way as the construction indicated in Fig. 2. A guide screw 25 serves to hold the movable member against rotary movement as is the case in the other form of construction. The outer peripheral surface of this member 23$^a$ is annularly threaded to receive the corresponding internal threads of the operating wheel 28 that is mounted to be turned and held against endwise movement between the flange 30 and plate 32 which is secured to the face of the body 16$^a$ by screws 33. It will be noted from the foregoing that the essential elements of this form of construction are similar to those employed in Fig. 2 although in one instance the operating member moves longitudinally on the body to operate the movable member while in the latter instance it merely rotates and is directly connected with the movable members to shove it forward and backward.

The form of construction shown in Figs. 5, 6, and 7 illustrates the application of the same operative elements applied to an internal chuck where it is desired to hold a cylindrical body upon the chuck instead of within it, and leaving the larger peripheral surface of the body free to be operated upon. In this case the gripping surface of the jaws are disposed outward while the ball bearings as well as the movable member 23$^b$ are arranged upon the inside. The operating wheel 28 is provided with a stem that is suitably held by the lathe against longitudinal movement so that its threaded engagement with the movable member 23$^b$ will serve to draw the latter backward and forward according to the direction in which the operating wheel is turned.

Having thus described my invention, what I claim and desire to secure by Letters Patent is:

1. A lathe chuck comprising a body adapted to be secured to a lathe spindle and having a series of pockets formed therein a series of radially disposed clamping jaws slidably mounted in said pockets and provided with ball sockets in one of their end portions, a longitudinally movable member mounted on the body and having recessed longitudinally inclined ways to aline with the pockets, balls contained in the sockets and inclined ways and between the jaws and slidable members and a rotatable handled operating member connected with the slidable member whereby the latter is moved longitudinally to slide the jaws in their pockets through the engagement of the ball bearings.

2. A lathe chuck having a body adapted to be secured to a lathe spindle and having a series of pockets formed therein, a series of radially disposed clamping jaws slidably mounted in said pockets, a longitudinally movable member covering one end of the jaws and having an inclined recessed way to aline with the pockets, balls contained in the inclined ways and between the jaw and slidable member, and a rotatable operating member threadably mounted upon the body beside the movable member and connected with the slidable member whereby the latter is moved longitudinally to slide the jaws in their pockets through the ball bearings mounted therebetween.

Signed at Bridgeport, in the county of Fairfield and State of Connecticut, this 8th day of March, A. D. 1918.

ALFRED M. GYDESEN.

Witnesses:
C. M. NEWMAN,
LILLIAN M. ALLING.